United States Patent [19]

Okamura et al.

[11] Patent Number: 5,657,938

[45] Date of Patent: Aug. 19, 1997

[54] VIDEO TAPE CASSETTE WITH FIXING PORTIONS REMOTELY POSITIONED FROM THE FRONT LID

[75] Inventors: Masatoshi Okamura; Hiroshi Kaneda, both of Saku; Haruo Shiba, Komoro, all of Japan

[73] Assignee: TDK Corporation, Tokyo, Japan

[21] Appl. No.: 558,922

[22] Filed: Nov. 13, 1995

Related U.S. Application Data

[63] Continuation of Ser. No. 331,875, Nov. 1, 1994, abandoned, which is a continuation of Ser. No. 111,005, Aug. 24, 1993, abandoned.

[30] Foreign Application Priority Data

Aug. 26, 1992 [JP] Japan .................................. 4-065111

[51] Int. Cl.$^6$ .................................................. G11B 23/04
[52] U.S. Cl. ............................ 242/347.1; 360/132
[58] Field of Search .............................. 242/347.1, 348; 360/132

[56] References Cited

U.S. PATENT DOCUMENTS 4,875,641 10/1989 Endo et al. ............................... 242/199
4,933,796 6/1990 Tanaka ..................................... 360/132

FOREIGN PATENT DOCUMENTS 54-91818 6/1979 Japan .

*Primary Examiner*—John Q. Nguyen
*Attorney, Agent, or Firm*—Oblon, Spivak, McClelland, Maier & Neustadt, P.C.

[57] ABSTRACT

A tape cassette having a synthetic resin casing accommodating a tape-like medium composed of an upper half casing, a lower half casing and a front lid, the upper and lower half casings being integrated by a plurality of fixing portions. A plurality of fixing portions are disposed at first positions which are outside of a second position of the front lid. Slackening of screw fixation of the upper and lower half casings is preventing and incapacitance in rotating the front lid due to melt-bonding of the front lid and the upper half casing is avoided.

3 Claims, 3 Drawing Sheets

VIDEO TAPE CASSETTE WITH FIXING PORTIONS REMOTELY POSITIONED FROM THE FRONT LID

This application is a continuation of application Ser. No. 08/331,875, filed on Nov. 1, 1994, now abandoned, which is a continuation of Ser. No. 08/111,005, filed on Aug. 24, 1993, also abandoned.

BACKGROUND OF THE INVENTION

1. Field of the Invention

This invention relates to a tape cassette such as a video cassette which accommodates a record media, for instance, a tape-like media in a casing.

2. Discussion of Background

Generally speaking, an information media of a video cassette is apt to capture dirt and dust in handling, which may damage the information media. Therefore, the information media is protected by being accommodated in a synthetic resin casing. This case is constructed by fastener-fixing or melt-bonding an upper half casing and a lower half casing at a plurality of fixing portions, which are formed by an ABS resin (acrylonitrile butadiene styrene copolymer resin), a PS resin (polystyrene species resin), a PP resin (polypropylene species resin) or the like. The upper half casing and the lower half casing are integrated by fixing opposedly protruded projections respectively provided on the upper and lower half casings, by screws or by ultrasonic melt bonding and the like. The fixing of the projections are performed at positions which are as proximate as possible to the outer peripheral portion, other than at the central portion thereof, to prevent deformation and the like.

As shown in FIGS. 3 and 4, the fixing portions of the upper and lower half casings are disposed as proximate as possible to the outer peripheral portion, other than at the central portion, at least one of which is a fixing portion $P_1$ of which position is inside of a rotatable front lid 3. Protrusions $1_1$ and $2_1$ are oppesely provided on the inner faces of the upper half casing 1 and the lower half casing 2, at these fixing portions P and $P_1$. However, the following problems are caused in the fixing operation at the fixing portion $P_1$ of which position is inside the position of the front lid 3, which are compounded by the integration cycle.

(1) In case of the fastening by screws, a failure in fixing such as the slackening of a screw, destruction of a screw ridge or the like is caused by a clearance C between the upper half casing 1 and the front lid 3.

(2) In case of the fixing by the ultrasonic melt-bonding, the ultrasonic vibration during the melt-bonding process transmitted to the front lid 3, the front lid 3 and the upper half casing 1 are melted and bonded together, and the rotating function of the front lid 3 is in failure.

SUMMARY OF THE INVENTION

It is an object of the present invention to provide a tape cassette capable of preventing the slackening of a screw, the destruction of a screw ridge, the failure in the rotating function of the front lid, or the like in fixing the upper and lower half casings.

According to an aspect of the present invention, there is provided a tape cassette comprising a synthetic resin casing accommodating a tape-like medium composed of an upper half casing, a lower half casing and a front lid, said upper and lower half casings being integrated by a plurality of fixing portions, wherein said plurality of fixing portions are disposed at first positions which are outside of a second position of said front lid.

According to the present invention, the failure such as the slackening of a screw and the destruction of a ridge which has been the conventional problem, is not caused, in fixing the upper and lower half casings, and the failure in the rotating function by the melt-bonding of the front rid to the upper half casing is not caused in case of the ultrasonic melt-bonding, thereby providing a tape cassette having high reliability.

DETAIL DESCRIPTION OF THE PREFERRED EMBODIMENTS

Figure 1:
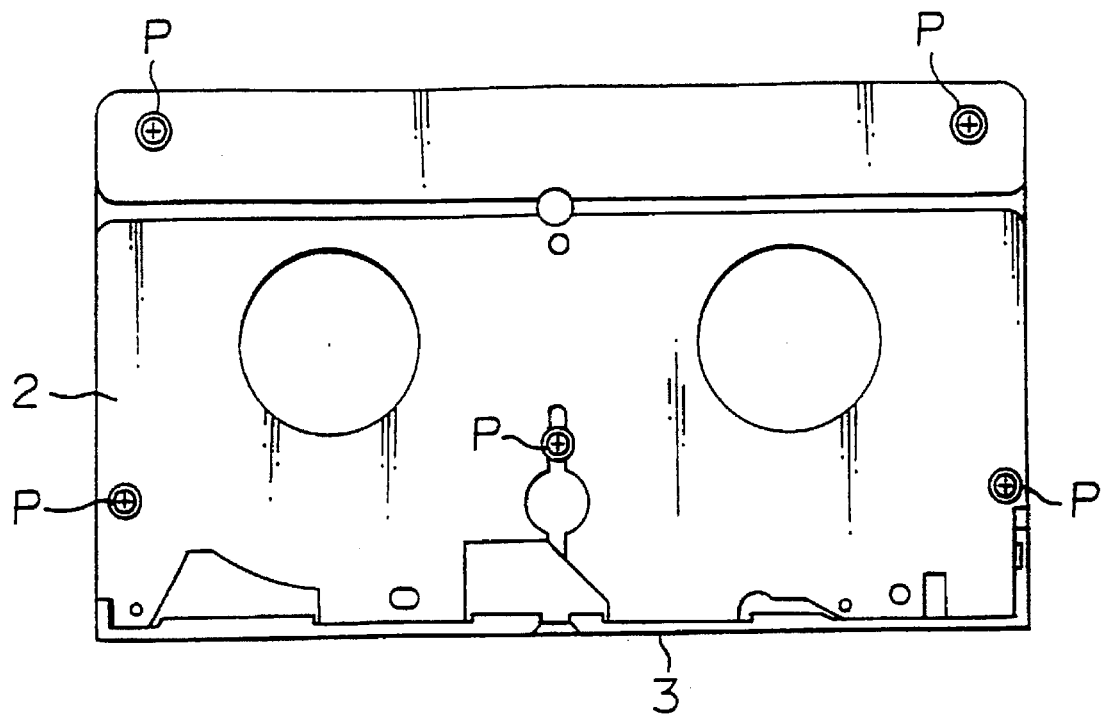
FIG. 1 is a plane view showing an example of a rear face of a tape cassette according to the present invention.
Figure 2:
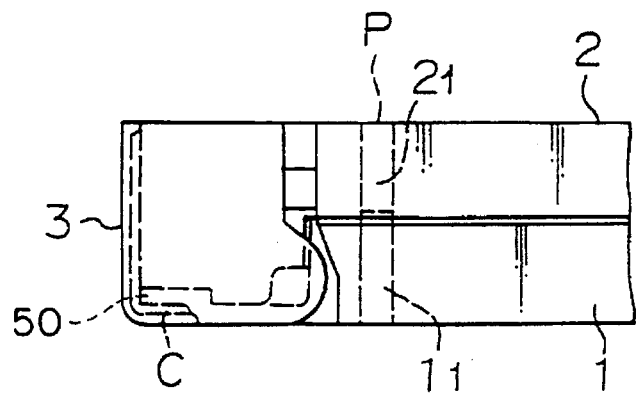
FIG. 2 is a partial side view of FIG. 1.
Figure 3:
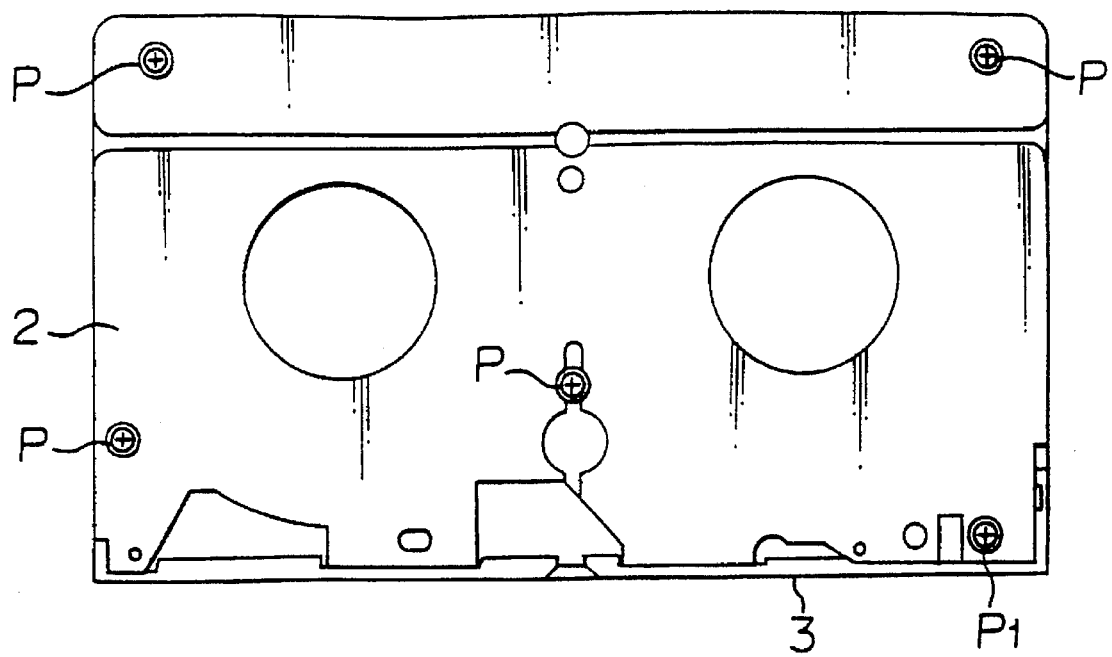
FIG. 3 is a plane view of a rear face of a tape cassette showing a conventional example.
Figure 4:
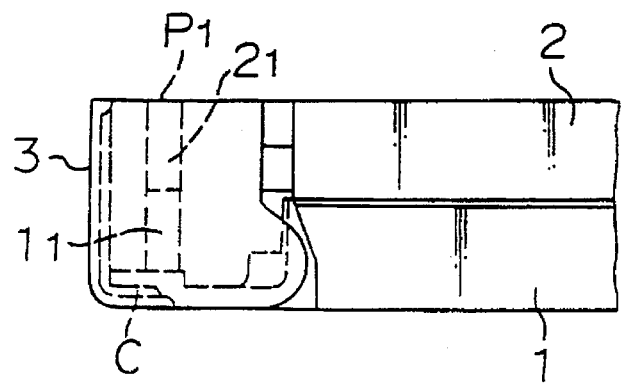
FIG. 4 is a partial side view of FIG. 3.

An embodiment of the present invention is to be explained in reference to FIGS. 1 and 2. The embodiment is composed of a polypropylene species resin casing, comprising an upper casing 1, a lower casing 2 and a front lid 3 which rotatably engages with both end portions of the upper half casing 1. After accommodating a tape-like media, the upper and lower half casings 1 and 2 are integrated by fixing them at fixing portions. The fixing portions P of the upper and lower half casings 1 and 2, are disposed at positions at the central portion and at positions proximate to the outer periphery, and at positions which are outside of the position of the front lid, without disposing them at a position which is inside of the position of the front lid 3 as in the conventional case, so far as there is no inconvenience in the inner structure in consideration of the total balance and the rigidity.

Projections $1_1$ and $2_1$ of the fixing portions P, which are provided on inner faces of the upper and lower half casings 1 and 2, are constructed by hollow cylinders in case of fastening by screws, and columnar projections and engaging recesses in case of fixing by the ultrasonic melt-bonding. In the present invention, a lip 50 (FIG. 2) of the upper casing 1 extends beneath the top side of the front lid 3 and forms a clearance C between the top side of the front lid 3 and the lip 50.

Figure 5:
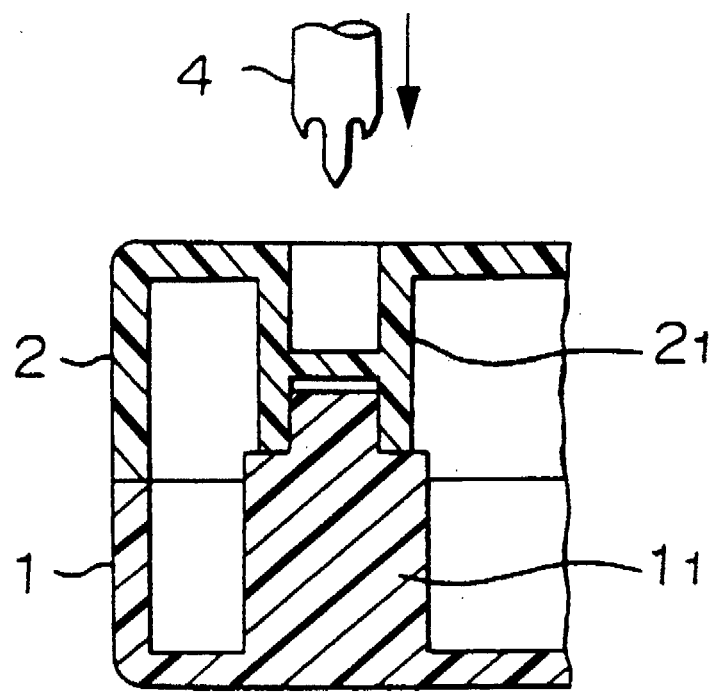
FIG. 5 is a sectional diagram showing a fixing portion which is fixed by an ultrasonic melt bonding.

FIG. 5 is a sectional diagram showing a fixing portion which is fixed by an ultrasonic melt bonding. In FIG. 5, a notation $1_1$ designates the columnar projection, and $2_1$, the engaging recess. A numeral 4 designates a melt-bonding horn which melt-bonds the columnar projection 11 and the engaging recess $2_1$.

As stated above, according to the present invention, the synthetic resin case accommodating a tape-like medium is composed of the upper half casing, the lower half casing and the front lid, the upper and lower half casings are integrated into a tape cassette by the plurality of fixing portions, and the positions of the fixing portions are disposed outside of the position of the front lid. With this arrangement, no defect arises in fastening by screws because of the clearance between the upper half casing and the front lid, nor does a malfunction of rotation occur by the melt-bonding of the front lid and the upper half casing. Therefore, this invention provides a practical tape cassette which considerably promotes the reliability and the commercial value of tape cassettes.

What is claimed is:

1. A standard size VHS video cassette comprising:

a synthetic resin casing for containing a tape medium, the casing including an upper half member having an upper surface, and a lower half member having a lower surface, said casing having a front surface, side surfaces and a rear surface;

a front lid rotatably connected to the front surface of the casing and having a top side which is parallel to the upper surface and a front side which is perpendicular to the upper surface;

a lip of the upper half member which extends beneath the top side of the front lid so as to define a clearance between the top side of the front lid and the lip of the upper half member; and fixing portions for securing the upper half member to the lower half member, the fixing portions comprising projections provided on inner faces of the upper and lower half members, all of said fixing portions being spaced from said front lid and said lip in a direction toward the rear surface of the casing, and being positioned at a central portion of the casing and adjacent to the side surfaces of the casing.

2. The video cassette according to claim 1, wherein the projections of the fixing portions are integrated to each other by melt-bonding.

3. The video cassette according to claim 1, wherein the fixing portions include screws.

* * * * *